United States Patent [19]

Han et al.

[11] Patent Number: 5,328,669

[45] Date of Patent: * Jul. 12, 1994

[54] EXTRACTION OF PRECIOUS METALS FROM ORES AND OTHER PRECIOUS METAL CONTAINING MATERIALS USING HALOGEN SALTS

[75] Inventors: Kenneth N. Han; Xinghui Meng, both of Rapid City, S. Dak.

[73] Assignee: South Dakota School of Mines and Technology, Rapid City, S. Dak.

[ * ] Notice: The portion of the term of this patent subsequent to May 19, 2009 has been disclaimed.

[21] Appl. No.: 9,177

[22] Filed: Jan. 26, 1993

[51] Int. Cl.$^5$ ............................................... C01G 3/14
[52] U.S. Cl. ........................................ 423/32; 423/33; 423/23; 423/27; 423/30; 423/34
[58] Field of Search ........................ 423/23, 27, 30, 34

[56] References Cited

U.S. PATENT DOCUMENTS

| | | | |
|---|---|---|---|
| 3,709,681 | 1/1973 | Wilson et al. | 75/109 |
| 3,775,099 | 11/1973 | Coffield et al. | 75/119 |
| 3,778,252 | 12/1973 | Wilson | 75/101 R |
| 3,826,750 | 7/1974 | Wilson | 252/187 R |
| 3,957,505 | 5/1976 | Homick et al. | 423/38 |
| 3,988,415 | 10/1976 | Barr | 423/22 |
| 4,070,182 | 1/1978 | Genik-Sas-Berezowsky et al. | 75/103 |
| 4,093,698 | 6/1978 | Cardwell | 423/24 |
| 4,137,291 | 1/1979 | Cardwell et al. | 423/24 |
| 4,146,572 | 3/1979 | Cardwell et al. | 423/32 |
| 4,269,622 | 5/1981 | Kerley, Jr. | 75/103 |
| 4,319,923 | 3/1982 | Falanga et al. | 75/108 |
| 4,369,061 | 1/1983 | Kerley, Jr. | 75/103 |
| 4,375,984 | 3/1983 | Bahl et al. | 75/97 A |
| 4,557,759 | 12/1985 | McGrew et al. | 75/118 R |
| 4,654,078 | 3/1987 | Perez et al. | 75/118 |
| 4,684,404 | 8/1987 | Kalocsai | 75/118 R |
| 4,980,134 | 12/1990 | Butler | 423/27 |
| 5,114,687 | 5/1992 | Han | 423/32 |
| 5,139,752 | 8/1992 | Nakao et al. | 423/27 |

OTHER PUBLICATIONS

A. B. Abdullaev et al., "Autoclave Leaching of Auriferous Sulfide Ore", Tsvetnyemetally/Non-Ferrous Metals, pp. 91–92, Jun. 1975.

K. Tozawa et al., "Dissolution of Gold in Ammonical Thiosulfate Solution", 1971.

Groenewald T., "The Dissolution of Gold in Acidic Solutions of Thiourea," Hydrometallurgy, vol. 1 (1977) 277–290.

Schulze, R. G., "New Aspects in Thiourea Leaching Precious Metals," Journal of Metals, Jun. (1984) 62–65.

Hiskey, J. B. and Atluri, V. P., "Dissolution Chemistry of Gold and Silver in Different Lixivants," Mineral Processing and Extractive Metallurgy Review, vol. 4 (1988) 95–134.

Kerley, B. J., "Recovery of Precious Metals from; Difficult Ores," U.S. Pat. No. 4,269,622 (1981).

Scheiner, B. J., "Processing of Refractory Carbonaceous Ores for Gold Recovery," Journal of Metals, vol. 23, No. 3 (1971) 37–40.

Han, K. N. and Vu, C., "Leaching Behavior of Cobalt in Ammonia Solutions," Trans. IMM Sec. C, vol. 86 (1977) C119–125.

Han, K. N., Bhuntumkomol K. and Lawson, F., "Leaching Behavior of Metallic Nickel in Ammonia (List continued on next page.)

Primary Examiner—Paul J. Killos
Attorney, Agent, or Firm—Frank P. Presta

[57] ABSTRACT

Platinum group metals, gold and silver are extracted from complex ores, automobile scrap, refractory ores and as naturally occurring by leaching the precious metal containing materials with a solution containing halogen salts such as potassium or sodium iodide and bromide in the presence of ammonium ions and oxygen. The precious metal containing materials and reactants are charged into a reaction zone held at high temperatures and pressures to form a slurry containing a precious metal ion solution. The precious metal ion solution is separated from the slurry and subjected to recovering techniques to recover the precious metals.

22 Claims, No Drawings

OTHER PUBLICATIONS

Solutions," Trans. IMM. Sec. C, vol. 89 (1980) C7–13.

Han, K. N., Vu, C. and Lawson, F., "Leaching Behavior of Cobaltous Cobalto–Cobaltic Oxides in Ammonia and in Acid Solutions," Hydrometallurgy., vol. 6 (1980) 75–87.

Han, K. N. and Bhuntumkomol, K., "Kinetics of Leaching Metallic Nickel Powder in Ammoniacal Solutions," Trans. IMM. Sec. C., vol. 91 (1982) C1–4.

Han, K. N. Nebo, C. O. and Ahmad, W., "The Leaching Kinetics of Cobalt and Nickel from Aluminum–Coprecipitated Products," Met. Trans. B 18B (1987) 635–640.

Skibsted, L. H. and Bjerrum, J., "Gold Complexes I, Robustness, Stability and Acid Dissolution of the Tetramminegold (III) ion," Acta. Chemica Scan-divica, vol. A28, No. 7 (1974) 740–746.

Skibsted, L. H. and Bjerrum, J., "Gold Complexes II, Equilibrium between Gold (I) and Gold (III) in the Ammonia System and the Standard Potentials of the Couples Involving Gold Diamminegold (I) and Tetramminegold (IV)," Acta. Chemica Scandivica, vol. A28, No. 7 (1974) 760–770.

Meng Xinghui, "E–pH Diagrams and Thermodynamic Analysis of the Au–$NH_3$–$H_2O$ System", Engineering Chemistry & Metalurgy, vol. 9, No. 3 (1988), pp. 56–60.

K. Bhuntumkomol, K. N. Han et al., "The Leaching Behavior of Nickel Oxides in Acid and in Ammonical Solutions", Hydrometallurgy, vol. 8 (1982), 147–160.

EXTRACTION OF PRECIOUS METALS FROM ORES AND OTHER PRECIOUS METAL CONTAINING MATERIALS USING HALOGEN SALTS

FIELD OF THE INVENTION

The present invention relates to a method of extracting precious metals from ores and other precious metal containing materials by leaching to recover the precious metals and, in particular, extracting platinum group metals, gold and silver using halogen salts in an autoclave at predetermined temperatures and pressures.

BACKGROUND ART

A major source of the platinum group metals (platinum, iridium, osmium, palladium, rhodium, and ruthenium, hereinafter "PGM") is frequently associated with Cu-Ni deposits, and these metals usually occur in conjunction with nonferrous metal sulfide ores. Another source of PGM which is becoming important, especially in the U.S., is the secondary source, namely, scrap of various computer parts, printed circuit boards, connectors, and auto-exhaust catalysts.

PGM are traditionally recovered by aqua regia or $HCl/Cl_2$. Almost all sulfidic PGM ores that are treated today are subject to a concentration procedure which includes froth flotation. Flotation concentrates are typically subjected to roasting in which the majority of sulfur is removed. Such an up-grading process is necessary because PGM associated with sulfide ores are frequently refractory. Another method is the direct smelting of the flotation concentrate to produce matte. This process is usually carried out at 1250° C.–1350° C. resulting in expensive operating and capital costs. The roasted and smelted products are then subjected to leaching. First, leaching of copper and nickel in a mild acidic environment is carried out with subsequent leaching in either aqua regia or $HCl/Cl_2$ to extract platinum, palladium and other PGM. Because platinum-group metals are very inert, their extraction is very expensive. For example, the extraction of these metals from automobile catalysts is known to be notoriously expensive because of the high cost associated with reagent consumption. The methods used to process these metals tend to dissolve even silica and alumina, which are frequently the base matrix of platinum-group metals. As a result, the process suffers from high acid consumption and severe acid corrosion problems.

Almost all gold currently produced from ores in the world is extracted by cyanidation leaching. This method of extraction, however, has several drawbacks. First, cyanide is an extremely toxic compound, creating the need for expensive transportation, storage, and cleanup procedures. Furthermore, the leaching kinetics of gold and silver with cyanide is very slow. Leaching residence time is typically 2–4 days.

In addition, direct cyanidation leaching of refractory gold-bearing ores is not successful. One of the major challenges currently experienced by the extractive metallurgy industry is the efficient recovery of precious metals from refractory ores. There have been various ways practiced in industry to treat sulfidic refractory ores. Commonly practiced techniques for treating sulfide ores include high temperature roasting of the ore followed by leaching. Another technology utilizes pressure oxidation of these ores in an autoclave followed by extraction of precious metals from the ore. The cost of these two-stage processes is found to be excessive and, therefore, researchers have long been looking for alternative ways to treat this refractory ore. In the case of carbonaceous refractory ores, the carbonaceous material is destroyed or treated before extraction of gold is attempted. The carbonaceous material is frequently subjected to oxidation using ozone, chlorine, sodium hypochlorite, permanganates, perchlorates, and oxygen. Chlorine is currently used in the treatment of these carbonaceous ores. However, due to the high cost of chlorine, it is desirable to find an alternate way of treating this ore.

In the past, extraction of gold from gold bearing ores included the use of halogen elements. U.S. Pat. Nos. 3,957,505 and 4,557,759 deal with the hydrometallurgical recovery of gold from materials containing gold by introducing elemental iodine and iodide into the solution containing such materials.

U.S. Pat. Nos. 3,709,681, 3,826,750, and 3,778,252 deal with the extraction of precious metals such as platinum, palladium and gold from noble metal- containing materials by mixtures of organic solvents and a halogen element or compounds at ambient temperature. Although these processes are concerned with the extraction of precious metals from different sources using iodide and/or iodine, the medium used in these processes is organic and the conditions used are very different, and the environments in which these metals are associated with are very limited compared with those of the current invention.

U.S. Pat. No. 4,319,923 deals with the recovery gold and/or palladium from iodide-iodine etching or similar solutions. These technologies teach an art of separating precious metals from other metals in the solution, once they are in solution in the form of dissolved species.

Accordingly, a need has developed to extract platinum group metals, gold and silver from various materials in an efficient and economically advantageous manner. In response to this need, the present invention provides a method of extracting precious metals from ores or other precious metal containing materials such as scrap which overcomes the disadvantages noted above in the prior art. The inventive extractive method avoids problems with corrosion and acid soluble species by extracting the precious metals at increased pH levels. The inventive extractive method permits recovery of precious metals from previously difficult to work with refractory and carbonaceous gold-bearing ores.

The inventive extracted method is also very effective in extracting both platinum group metals and gold and silver under conditions of high temperature and pressure to improve precious metal recovery.

SUMMARY OF THE INVENTION

Accordingly, it is an object of the present invention to provide an improved process for the extraction of platinum group metals, silver and gold from various sources including refractory ores, scrap, catalysts, and roasted/smelted products. The current process is substantially free of one or more disadvantages of prior processes.

Another object is to provide an improved process for the extraction of platinum group metals, silver and gold from their ores, scrap, catalysts and roasted/smelted products while avoiding the use of cyanide or strong acids.

Still another object of the present invention is to provide an improved process for the extraction of platinum group metals and gold and silver from various source materials which provides a greater yield of these metals, and one which is less expensive, more economical, and safer than the prior art processes.

A further object of the invention is to provide an extractive method for obtaining gold, silver and platinum group metals which use less reactants due to recycling of the halogens during processing.

Additional advantages of the present invention will be apparent to those skilled in the art by reference to the following detailed description.

In satisfaction of the foregoing objects and advantages, the present invention comprises a method for the extraction of precious metals by a leaching process comprising the steps of charging to a reaction zone; precious-metal bearing materials, water, a halide and/or elemental halogen, and ammonium ions as a leaching solution to form a charged reaction zone, heating the charged reaction zone to a temperature of about 50° C. to about 300° C. under oxidizing conditions at a pressure of from about 30 psig to about 1300 psig for a time sufficient to leach the precious metals from the precious-metal ore thereby producing a slurry containing a precious-metal-ion-solution, separating the precious-metal-ion-solution from the slurry and recovering the precious metals from the precious-metal-ion-solution.

In another aspect of the invention, the method of extraction of precious metals may be used for refractory ores or carbonaceous ores. In this method, activated carbon is included in the reaction zone along with the precious-metal bearing materials, water, ammonium ions and either a halide or an elemental halogen or a combination thereof. The charged reaction zone is then subjected to the processing conditions similar to those as described above.

The precious metal containing materials may be first ground to a predetermined size prior to charging to the reaction zone. The precious-metal-ion solution formed may be subjected to techniques such as electrowinning, cementation, solvent extraction, gas-reduction and adsorption to recover the precious metals contained therein.

DESCRIPTION OF THE PREFERRED EMBODIMENTS

The present invention utilizes halogen salts to extract gold from various sources including refractory ores and scrap. When the current technology is applied to sulfidic refractory gold ores, sulfide minerals in the ore will be first destroyed by oxidation resulting in easy access to gold particles which will then be reacted with lixiviants. On the other hand, for carbonaceous gold-bearing ores, the inventive technology is effective in dissolving gold and at the same time in preventing readsorption of once-dissolved gold on to carbonaceous material. Although the current technology does not require, in principle, an ammonium salt, the oxidation step of halogen salts is tremendously facilitated in the presence of the ammonium ion. The ammonium ion acts as a catalyst in the oxidation process of iodide to iodine and triiodide ion. As a result, the concentration of halogen salts required is greatly reduced in the presence of the ammonium ion. Therefore, the use of an ammonium salt is an economical advantage especially when the process is to be applied at a pH greater than 4.

The major advantage of this new technology in comparison to the existing technologies available for extracting PGM lies in the fact that the current halogen-salt based process is capable of extracting platinum-group metals at a pH greater than 4. Problems associated with corrosion and acid soluble species are minimal at these high pH levels.

The current invention utilizes elemental halogens, halides or halogen salts as the key solvent to dissolve platinum group metals, silver and gold from their solid forms, such as the native state, complex ores, scrap, or catalysts. Preferred halides include alkali metal halides such as potassium bromide or iodide, sodium bromide or iodide or mixtures thereof. Other halides such as ammonium iodide can also be utilized in the inventive method. Ammonium salts such as ammonium-sulfate, -carbonate, -chloride or -nitrate may be added to the solution to facilitate the dissolution reaction when the process is to be operated at a pH greater than 4.

Platinum group metals, silver and gold are extracted from their native state, complex ores, refractory ores, automobile catalysts, and other secondary sources by utilizing halogen, oxygen, and ammonium salts. The invention is comprised of the following steps. First, these metals or metal-containing materials such as ores or scrap, and a leaching solution containing potassium or sodium halogen salts iodide, bromide or mixture of both, an ammonium salt and oxygen are combined as a charge. This charge is then subjected to pressure in a pressure vessel or an autoclave to provide a liquid-solid suspension. The suspension is also heated in order to facilitate the dissolution reaction.

The ore samples are usually reduced in size to increase the metallurgical efficiency of the extraction. Typically, the platinum group metals, silver and gold bearing materials are ground to less than 100 mesh (U.S.). Of course, other sizes may be selected depending on the raw material characteristics.

The leach solution consists of halogen salts, oxygen, if used, and an ammonium ion, preferably an ammonium salt. The preferred ammonium salts are ammonium sulfate, ammonium nitrate, ammonium chloride and ammonium carbonate. The preferred pH of the solution is between 3.0 and 10.0. At this pH level, there will be fewer problems with corrosion and acid consumption. Preferably, the concentration of halogen salts or elemental halogen will be 0,005 to 2 gram-mole per liter of the solution. When recovering gold and silver from refractory ores, a preferred concentration range includes 0,005 to 1.0 gram-mole per liter of solution. When recovering platinum group metals, gold and silver, a preferred range includes 0.01 to 1.0 gram-mole per liter. The concentration of ammonium salts is typically 0.005 to 2.0 gram-moles per liter, and the partial pressure of oxygen could be as low as 30 psi (207 kN/m$^2$) or as high as 1300 psi (8970 kN/m$^2$). Instead of oxygen, other oxidants such as hypochlorite, iodine, bromine, and manganese dioxide could be used. However, oxygen is preferred because of its low cost and easy availability.

The contents of the pressure vessel or autoclave are then heated to a temperature from about 50° C. to 300° C., preferably between 150° C. and 200° C. Since the overall dissolution reaction is controlled by surface chemical reaction, the dissolution of these metals is very much sensitive to the temperature of the system.

The pressure of the system is at least the corresponding equilibrium water pressure for the temperature employed. However, pressure increases with the amount of oxygen used for the system. The typical pressure to be employed is between 30 and 1300 psig (207-8970 kN/m$^2$).

When platinum group metals, gold and silver are leached out into the solution, these metals can be removed from the solution via conventional techniques such as solvent extraction, ion exchange gaseous reduction, cementation or adsorption since these techniques are well known in the art. The solution can be separated from residual solids using conventional techniques such as filtration.

EXAMPLES

The following specific examples are illustrative but are not limitations of the current invention. It should be understood that similar results could be obtainable with other combinations of conditions other than those specifically considered in the following examples.

EXAMPLE I

This example is illustrative of the present invention.

The following quantities of the following ingredients were added to an autoclave.

| Item | Ingredient | Quantity |
|------|------------|----------|
| A. | Platinum-palladium bearing materials | 100 grams |
| B. | Water | 0.4 liters |
| C. | Potassium iodide | 13.2 grams |
| D. | Sodium bromide | 21 grams |
| E. | Ammonium sulfate | 27 grams |

Item A was a ground material passing through a US standard screen of 150 mesh per inch from automobile catalytic converters and consisted of 400 ppm of platinum and 130 ppm of palladium imbedded in an alumina matrix. The concentration of potassium iodide was 0.2 gram-mole per liter, sodium bromide 0.5 gram-mole per liter and ammonium sulfate 0.5 gram-mole per liter.

The autoclave was closed and oxygen gas added until the partial pressure of oxygen gas in solution reached a level of 145 psig. A stirrer in the autoclave was activated at a speed of 350 rpm. The pH of the solution was 5.6. The autoclave and its contents were heated to a temperature of 185° C. and maintained at that temperature for 4 hours whereupon the autoclave was cooled, vented to the atmosphere and opened. The contents of the autoclave were found to be a slurry and a precious-metal ion containing solution wherein solid concentration was 17.8% by weight. The solution was then separated from the solids by filtration.

The recovery of platinum and palladium was evaluated by analyzing the contents of platinum and palladium in the solution using an Atomic Absorption Spectrophotometer/Inductively Coupled Plasma. The solid residue was also analyzed by fire-assay to confirm the final recovery.

The recovery values of platinum and palladium after leaching under the conditions specified above were typically 95% and 96%, respectively.

EXAMPLE II

This example is illustrative of the present invention.

The following quantities of the following ingredients were added to an autoclave.

| Item | Ingredient | Quantity |
|------|------------|----------|
| A. | Platinum-palladium bearing materials | 50 grams |
| B. | Water | 0.4 liters |
| C. | Potassium iodide | 6.6 grams |
| D. | Sodium bromide | 21 grams |
| E. | Ammonium sulfate | 27 grams |
| F. | Iodine | 1.2 grams |

This was the same material as noted in Example I. However, the conditions used were different as given above. The concentration of potassium iodide was 0.1 gram-moles per liter, sodium bromide 0.5 gram-moles per liter and ammonium sulfate 0.5 gram-moles per liter.

The autoclave was closed but no oxygen gas added. A stirrer in the autoclave was activated at a speed of 0 rpm. The pH of the solution was 5.6. The autoclave and its contents were heated to a temperature of 185° C. and maintained at that temperature for 2 hours whereupon the autoclave was cooled, vented to the atmosphere and opened. The contents of the autoclave were found to be a slurry and a precious-metal ion containing solution with solid concentration being 10% by weight. The solution was then separated from the solids by filtration.

The recovery of platinum and palladium was evaluated the same way as in the case of Example I.

The recovery values of platinum and palladium after leaching under the conditions specified above were typically 96% and 95%, respectively. It should be noted that in this experiment the element iodine was used in the absence of oxygen. It is important to note that in this experiment, when the elemental iodine was used up, no further reaction would occur. On the contrary, in the experiment conducted in Example I, iodine and/or triiodide ion was regenerated due to oxidation of the iodide produced during the oxidation reaction. As a result, savings of the reagent will be realized through the continuous recycling of the used reagent.

EXAMPLE III

This example is illustrative of the present invention.

The following quantities of the following ingredients were added to an autoclave.

| Item | Ingredient | Quantity |
|------|------------|----------|
| A. | Gold-sulfide ore | 25 grams |
| B. | Water | 0.4 liters |
| C. | Potassium iodide | 1.1 grams |
| D. | Ammonia | 7 grams |

Item A was a gold-sulfide ore which was obtained from a mining company in Montana. The ore consists primarily of pyrite with which some gold and silver particles are associated. Hence, the ore exhibits a refractory property. In this case, a flotation concentrate of this sulfide refractory ore was supplied by the mining company. The contents of gold and silver of the concentrate were 1.4 and 10.0 oz/ton, respectively. Free ammonia concentration was 1.0 gram-mole per liter and potassium iodide concentration was 0.016 gram-mole per liter.

The autoclave was closed and oxygen gas added until the partial pressure of oxygen gas in solution reached a level of 145 psig. A stirrer in the autoclave was activated at a speed of 350 rpm. The autoclave and its contents were heated to a temperature of 175° C. and maintained at that temperature for 2 hours whereupon the autoclave was cooled, vented to the atmosphere and opened. The contents of the autoclave were found to be a slurry and a precious-metal ion containing solution with solid concentration being 6% by weight. The solution was then separated from the solids by filtration. The initial pH of the solution was 11 and the final pH was 3.

The recovery of gold and silver was evaluated the same way as in the case of Example I.

Gold recovery after leaching under the conditions specified above was better than 97%, but silver recovery was a mere 1%. It should be noted that in this experiment, free ammonia instead of ammonium salts was used because the ore contains sulfur which produces ammonium sulfate by reacting with free ammonia. Hence, the final pH dropped from pH 11 to 3. Silver recovery was improved to be better than 90% by another step of leaching with ammonia as specified by the authors' earlier invention (U.S. Pat. No. 5,114,687, the entirety of which is herein incorporated by reference).

EXAMPLE IV

This example is not illustrative of the present invention but is submitted for comparative purposes.

The following quantities of the following ingredients were added to a reactor at ambient conditions.

| Item | ingredient | Quantity |
| --- | --- | --- |
| A. | Gold-sulfide ore | 25 grams |
| B. | Water | 0.4 liters |
| C. | Sodium cyanide | 0.2 grams |
| D. | Lime | 0.5 grams |

Item A was an identical gold-sulfide ore used in Example III. As indicated in Example III, the contents of gold and silver of the concentrate were 1.4 and 10.0 oz/ton, respectively.

The reactor was closed and oxygen gas was bubbled under atmospheric conditions at 25° C. A stirrer in the reactor was activated at a speed of 350 rpm. The gold dissolution test was continued for 24 hours. The contents of the autoclave were found to be a slurry and a precious-metal ion containing solution. The solution pH was found to be about 10.5. The recovery of gold was evaluated the same way as in the case of Example I.

Gold recovery after leaching under the conditions specified above was found to be a mere 40-50%, which was consistent with the experience of the company providing the ore sample to us.

EXAMPLE V

This example is illustrative of the present invention.

The following quantities of the following ingredients were added to an autoclave.

| Item | Ingredient | Quantity |
| --- | --- | --- |
| A. | Carbonaceous gold ore | 100 grams |
| B. | Water | 0.4 liters |
| C. | Potassium iodide | 0.7 grams |
| D. | Ammonium sulfate | 13.2 grams |
| E. | Activated charcoal | 5 grams |

Item A was a carbonaceous gold ore which was obtained from a mining company in Nevada. The ore consisted of about 0.23 oz/ton of gold disseminated throughout the carbonaceous as well as gangue matrix. The gangue minerals can be characterized by clays and quartz. Potassium iodide concentration was 0.01 gram-mole per liter and ammonium sulfate concentration was 0.25 gram-mole liter. Activated charcoal concentration was 5 gram per 400 ml of leach solution.

Conventional cyanidation of this ore, as illustrated in Example IV, yielded a recovery of not more than 70% after 24 hours of leaching.

A number of tests on this ore were performed under the conditions as specified above. The autoclave was closed and oxygen gas added until the partial pressure of oxygen gas in solution reached a level of 145 psig. A stirrer in the autoclave was activated at a speed of 350 rpm. The autoclave and its contents were heated to a temperature of 180° C. and maintained at that temperature for 4 hours whereupon the autoclave was cooled, vented to the atmosphere and opened. The contents of the autoclave were found to be a slurry and a precious-metal ion containing solution with solids concentration of 20% by weight. The solution was then separated from the solids by filtration. The pH of the solution was 5.6.

The recovery of gold was evaluated the same way as in the case of Example I.

Gold recovery after leaching under the conditions specified above was better than 87%. One of the problems associated with these types of ores is the readsorption of once-dissolved gold on to the organic carbon substrate of the ore. Such readsorption phenomenon is known as preg-robbing. In order to prevent the preg-robbing, activated charcoal which is believed to be a better adsorbent than the organic carbon existing in the ore was added to the leach liquor. The problem of preg-robbing was also reduced greatly by filtering the residue while it is still hot.

EXAMPLE VI

This example is illustrative of the present invention.

The following quantities of the following ingredients were added to an autoclave.

| Item | Ingredient | Quantity |
| --- | --- | --- |
| A. | Gold-sulfide ore | 100 grams |
| B. | Water | 0.4 liters |
| C. | Potassium iodide | 0.7 grams |
| D. | Ammonium sulfate | 11 grams |

Item A was a sulfidic refractory gold ore sample which was provided by a mining company in Montana. The ore consisted not only of sulfide minerals but also carbonaceous material and exhibited a refractory nature. The ore consisted of 0.16 oz/ton of gold. Conventional cyanidation on a −200 mesh ore sample yielded a mere 45% gold recovery. Ammonium sulfate concentration was 0.2 gram-mole per liter and potassium iodide concentration was 0.019 gram-mole per liter. The −200 mesh ore sample was subjected to the leaching with conditions specified as below:

The autoclave was closed and oxygen gas added until the partial pressure of oxygen gas in solution reached a level of 145 psig. A stirrer in the autoclave was activated at a speed of 350 rpm. The autoclave and its contents were heated to a temperature of 160° C. and maintained at that temperature for 2 hours whereupon the autoclave was cooled, vented to the atmosphere and opened. The contents of the autoclave were found to be a slurry and a precious-metal ion containing solution.

The solution was then separated from the solids by filtration. The initial pH of the solution was 5.5 and the final pH was 8.5. Solid concentration was 20% by weight.

The recovery of gold was evaluated the same way as in the case of Example I.

Gold recovery after leaching under the conditions specified above was better than 95%. Because the readsorption of dissolved gold on the ore sample was less severe than that of the sample used in Example V, better recovery without the aid of activated charcoal was possible for this ore.

EXAMPLE VII

This example is illustrative of the present invention.

The following quantities of the following ingredients were added to an autoclave.

| Item | Ingredient | Quantity |
|------|------------|----------|
| A. | Carbonaceous-sulfidic gold ore | 50 grams |
| B. | Water | 0.4 liters |
| C. | Potassium Iodide | 1.1 grams |
| D. | Ammonium sulfate | 13.2 grams |
| E. | Activated Charcoal | 10 grams |

Item A was a sulfidic refractory as well as carbonaceous refractory ore which was obtained from a mining company in Nevada. The ore consisted of 0.84 oz/ton of gold and 1.6 oz/ton of silver. The −150 mesh ore sample was subjected to the leaching with conditions specified as below:

The autoclave was closed and oxygen gas added until the partial pressure of oxygen gas in solution reached a level of 145 psig. A stirrer in the autoclave was activated at a speed of 350 rpm. Concentration of potassium iodide was 0.016 gram-mole per liter, ammonium sulfate being 0.25 gram-mole per liter. The activated charcoal concentration was 10 grams per 400 ml of solution. The autoclave and its contents were heated to a temperature of 160° C. and maintained at that temperature for 4 hours whereupon the autoclave was cooled, vented to the atmosphere and opened. The contents of the autoclave were found to be a slurry and a precious-metal ion containing solution. The solution was then separated from the solids by filtration. The pH of the solution was about 3 throughout the experiment.

The recovery of gold and silver was evaluated the same way as in the case of Example I.

The recovery values of gold and silver after leaching under the conditions specified above were typically 88% and 93%, respectively. The high silver recovery is explained by the fact that silver was loaded on the activated charcoal before it was precipitated in solution as silver iodide.

'EXAMPLE VIII

This example is not illustrative of the present invention but is submitted for comparative purposes.

The following quantities of the following ingredients were added to an autoclave.

| Item | Ingredient | Quantity |
|------|------------|----------|
| A. | Elemental gold | 0.5 grams |
| B. | Water | 0.4 liters |
| C. | Potassium iodide | 6.1 grams |
| D(1). | Ammonium sulfate, or | 13.5 grams |
| D(2). | Ammnnium nitrate, or | 13.5 grams |
| D(3). | No Ammonium ion | |

Item A was elemental gold particles of less than 10 mesh.

The autoclave was closed and oxygen gas added until the partial pressure of oxygen gas in solution reached a level of 145 psig. A stirrer in the autoclave was activated at a speed of 350 rpm. The pH of the solution was 7.0. The autoclave and its contents were heated to a temperature of 160° C. and maintained at that temperature for 2 hours whereupon the autoclave was cooled, vented to the atmosphere and opened. The gold contents of these solutions were analyzed using an Atomic Absorption Spectrophotometer and found to be 928 ppm, 1300 ppm and less than 100 ppm respectively for ammonium sulfate, ammonium nitrate and no ammonium ion added. These results clearly demonstrate the critical and unique role of the ammonium ion in this process.

The inventive extractive method has also recovered rhodium in catalyst materials in amount up to 40% recovery value.

As such, an invention has been disclosed in terms of preferred embodiments thereof which will fulfill each and every one of the objects of the present invention as set forth hereinabove and provides a new and improved method of extracting precious metals from precious metal containing materials.

Various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. A method for the extraction of precious metals by a leaching process comprising the steps of:
   I. charging to a reaction zone:
      A. precious-metal bearing materials; and
      B. water, either a halide, an elemental halogen or a mixture thereof, and ammonium ions as a leaching solution to form a charged reaction zone;
   II. heating the charged reaction zone to a temperature of about 50° C. to about 300° C. under oxidizing conditions at a pressure of from about 30 psig to about 1300 psig for a time sufficient to leach the precious metals from the precious-metal ore thereby producing a slurry containing a precious-metal-ion-solution;
   III. separating the precious-metal-ion-solution from the slurry; and
   IV. recovering the precious metals from the precious-metal-ion-solution.

2. The method of claim 1 wherein said halide comprises a bromide, an iodide, or mixtures thereof.

3. The method of claim 1 wherein said ammonium ions comprise ammonium salts including ammonium sulfate, ammonium chloride and ammonium nitrate or mixtures thereof.

4. The method of claim 2 wherein the concentration of said halide and/or elemental halogen in said leach solution ranges between about 0.01 to 1.0 gram-mole per liter.

5. The method of claim 3 wherein said ammonium salt has a concentration in said leach solution of up to 2.0 gram-mole per liter.

6. The method of claim 1 wherein said slurry in the pressure vessel is maintained at a temperature of at least 50° C. up to 300° C. for at least 0.5 hours up to about 5 hours.

7. The method of claim 1 wherein the pH of the solution ranges between 3 and 10.

8. The method of claim 1 wherein oxygen is supplied to the charged reaction zone.

9. The method of claim 8 wherein an initial partial pressure of oxygen ranges between about 30 psi and 1300 psi.

10. A method for the extraction of precious metals from carbonaceous refractory ores, by a leaching process comprising the steps of:
   I. charging to a reaction zone:
      A. precious-metal bearing refractory materials;
      B. water;
      C. either a halide, an elemental halogen or a mixture thereof; and
      D. ammonium ions; to form a charged reaction zone;
   II. heating the charged reaction zone to a temperature of about 50° C. to about 300° C. under oxidizing conditions at a pressure of from about 30 psig to about 1300 psig for a time sufficient to leach the precious metals from the precious-metal material thereby producing a slurry containing a precious-metal-ion-solution;
   III. separating the precious-metal-ion-solution from the slurry; and
   IV. recovering the precious metals from the precious-metals-ion-solution.

11. The method of claim 10 wherein said halide comprises a bromide, an iodide, or mixtures thereof.

12. The method of claim 10 wherein the concentration of said halide, said elemental halogen or said mixture thereof in said leach solution ranges between about 0.01 to 1.0 gram-mole per liter.

13. The method of claim 10 wherein said ammonium ions comprise ammonium salts including ammonium sulfate, ammonium chloride and ammonium nitrate or mixtures thereof.

14. The method of claim 13 wherein said ammonium salt has a concentration in said leach solution of up to 2.0 gram-mole per liter.

15. The method of claim 10 wherein said slurry in the pressure vessel is maintained at a temperature of at least 50° C. up to 300° C. for at least 0.5 hours up to about 5 hours.

16. The method of claim 10 wherein the pH of the solution ranges between 3 and 10.

17. The method of claim 10 wherein oxygen is supplied to the charged reaction zone.

18. The method of claim 17 wherein an initial partial pressure of oxygen ranges between about 30 psi and 1300 psi.

19. The method of claim 10 further comprising the step of adding activated charcoal to said reaction zone to preferentially absorb dissolved gold and silver.

20. The method of claim 10 further comprising the steps of grinding said precious-metal bearing materials to a size passing 100 mesh (U.S.) and cooling said slurry prior to said separating step.

21. The method of claim 1 wherein said precious metals include platinum, palladium, osmium, rhodium, gold and silver.

22. The method of claim 10 wherein said precious metals include platinum, palladium, osmium, rhodium, gold and silver.

* * * * *